United States Patent [19]
Gloden

[11] Patent Number: 5,480,202
[45] Date of Patent: Jan. 2, 1996

[54] ANTI-SNAG PLATE FOR CRANE HOOKS

[76] Inventor: Charles J. Gloden, 8451 Valley View Rd., Macedonia, Ohio 44056

[21] Appl. No.: 338,659

[22] Filed: Nov. 14, 1994

[51] Int. Cl.$^6$ .................................................... B66C 1/36
[52] U.S. Cl. ........................................ 294/82.2; 24/599.8
[58] Field of Search ............................. 294/82.17, 82.19, 294/82.2; 24/599.1, 599.4, 599.5–599.9, 600.1, 601.5

[56] References Cited

U.S. PATENT DOCUMENTS

| | | | |
|---|---|---|---|
| 644,699 | 3/1900 | Woodford | 294/82.2 |
| 797,941 | 8/1905 | Corbett | 24/599.4 |
| 1,209,615 | 12/1916 | Obsboum | 24/599.5 X |
| 4,039,220 | 8/1977 | Stoops | 294/82.2 |
| 4,050,730 | 9/1977 | Tada et al. | 294/82.2 |
| 4,440,432 | 4/1984 | Goris | 294/82.2 |
| 4,955,651 | 9/1990 | Barber | 294/82.19 |

FOREIGN PATENT DOCUMENTS 1062747  3/1967  United Kingdom ................ 294/82.19

Primary Examiner—Dean Kramer

[57] ABSTRACT

An anti-snag plate for crane hooks, comprising a crane hook having a shank with an upper end and a lower end. The shank is curved and bent in a J-shaped configuration to design an upwardly extending point. The shank has an aperture adjacent to the main aperture. A safety plate is formed of an elongated configuration having an upper end with downwardly extending plates with apertures therethrough positionable in alignment with the minor aperture of the shank. The lower end of the safety plate is formed with a concave recess positionable in contact with the interior surface of the upstanding projection and movable downwardly with respect thereto. An anti-snag plate is formed in a rectangular configuration with an upper end and a lower end. The upper end is formed with downwardly extending plates and apertures therethrough positionable in alignment with the apertures of the safety plate and the minor apertures of the shank. The lower end is positionable upon the upper free end of the projection. A pivot pin is positioned through the minor aperture as well as the apertures of the anti-snag plate and the safety plate and a resilient member positioned upon the upper surface of the anti-snag plate and the lower surface of the safety plate to move such plates together toward the tip of the of projection.

1 Claim, 4 Drawing Sheets

ANTI-SNAG PLATE FOR CRANE HOOKS

BACKGROUND OF THE INVENTION

1. Field of the Invention

The present invention relates to an anti-snag plate for crane hooks and more particularly pertains to preventing a hook used in construction from being lodged on fences, building features and industrial electrical wiring or the like.

2. Description of the Prior Art

The use of crane hooks of a wide variety of designs and configurations is known in the prior art. More specifically, crane hooks of a wide variety of designs and configurations heretofore devised and utilized for the purpose of lifting items with crane hooks with minimum interference from extremis items through a wide variety of methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 3,480,319 to Raschke an antifouling safety gate for a hoisting hook.

U.S. Pat. No. 3,507,014 to McLain discloses a safety latch for crane hook.

U.S. Pat. No. 4,256,338 to McLennan discloses an anti-snag hook.

U.S. Pat. No. 4,948,190 to Lucas discloses a locking flapper type latch for crane hook.

Lastly, U.S. Pat. No. 5,020,843 to Lucas discloses a crane hook latch with sliding lock bar.

In this respect, the anti-snag plate for crane hooks according to the present invention substantially departs from the conventional concepts and designs of the prior art, and in so doing provides an apparatus primarily developed for the purpose of preventing a hook used in construction from being lodged on fences, building features and industrial electrical wiring or the like.

Therefore, it can be appreciated that there exists a continuing need for a new and improved anti-snag plate for crane hooks which can be used for preventing a hook used in construction from being lodged on fences, building features and industrial electrical wiring or the like. In this regard, the present invention substantially fulfills this need.

SUMMARY OF THE INVENTION

In view of the foregoing disadvantages inherent in the known types of crane hooks of a wide variety of designs and configurations now present in the prior art, the present invention provides an improved anti-snag plate for crane hooks. As such, the general purpose of the present invention, which will be described subsequently in greater detail, is to provide a new and improved anti-snag plate for crane hooks apparatus and method which has all the advantages of the prior art and none of the disadvantages.

To attain this, the present invention essentially comprises a new and improved anti-snag plate for crane hooks, comprising, in combination, a crane hook having a shank with an upper end and a lower end and having an opening extending through the upper end. The shank is curved and bent in a J-shaped configuration to design an upwardly extending point to an elevation beneath the aperture. The shank has an aperture adjacent to the opening. A safety plate is formed of an elongated configuration having a lower end and an upper end and with downwardly extending legs with apertures therethrough positionable in alignment with the aperture of the shank. The lower end of the safety plate is formed with a concave recess positionable in contact with the interior surface of the upstanding projection and movable downwardly with respect thereto. An anti-snag plate is formed in a rectangular configuration with an upper end and a lower end. The upper end is formed with downwardly extending legs and apertures therethrough positionable in alignment with the apertures of the safety plate and the minor apertures of the shank. The lower end is positionable upon the upper free end of the projection. A pivot pin is positioned through the minor aperture as well as the apertures of the anti-snag plate and the safety plate and a coil spring having free linear ends. The free linear ends are positioned upon the upper surface of the anti-snag plate and the lower surface of the safety plate to move such plates together toward the tip of the projection to thereby preclude the inadvertent coupling of objects to the projection for being secured to the hook through the safety plate.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved anti-snag plate for crane hooks which has all the advantages of the prior art crane hooks of a wide variety of designs and configurations and none of the disadvantages.

It is another object of the present invention to provide a new and improved anti-snag plate for crane hooks which may be easily and efficiently manufactured and marketed.

It is a further object of the present invention to provide a new and improved anti-snag plate for crane hooks which is of a durable and reliable construction.

An even further object of the present invention is to provide a new and improved anti-snag plate for crane hooks which is susceptible of a low cost of manufacture with regard to both materials and labor, and which accordingly is then susceptible of low prices of sale to the consuming public, thereby making such crane hooks of a wide variety of designs and configurations economically available to the buying public.

Still yet another object of the present invention is to provide a new and improved anti-snag plate for crane hooks which provides in the apparatuses and methods of the prior art some of the advantages thereof, while simultaneously overcoming some of the disadvantages normally associated therewith.

Still another object of the present invention is to prevent a hook used in construction from being lodged on fences, building features and industrial electrical wiring or the like.

Lastly, it is an object of the present invention to provide a new and improved anti-snag plate for crane hooks, comprising a crane hook having a shank with an upper end and a lower end. The shank is curved and bent in a J-shaped configuration to design an upwardly extending point. The shank has an aperture adjacent to the main aperture. A safety plate is formed of an elongated configuration having an upper end with downwardly extending plates with apertures therethrough positionable in alignment with the minor aperture of the shank. The lower end of the safety plate is formed with a concave recess positionable in contact with the interior surface of the upstanding projection and movable downwardly with respect thereto. An anti-snag plate is formed in a rectangular configuration with an upper end and a lower end. The upper end is formed with downwardly extending plates and apertures therethrough positionable in alignment with the apertures of the safety plate and the minor apertures of the shank. The lower end is positionable upon the upper free end of the projection. A pivot pin is positioned through the minor aperture as well as the apertures of the anti-snag plate and the safety plate and a resilient member positioned upon the upper surface of the anti-snag plate and the lower surface of the safety plate to move such plates together toward the tip of the projection.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
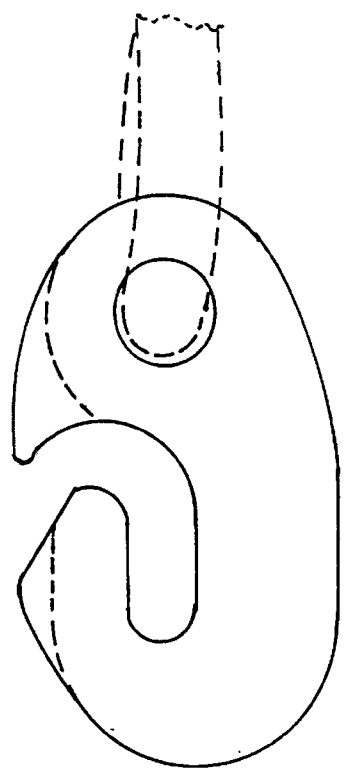
FIG. 1 is a side elevational view of a crane hook constructed in accordance with a prior art design.
Figure 2:
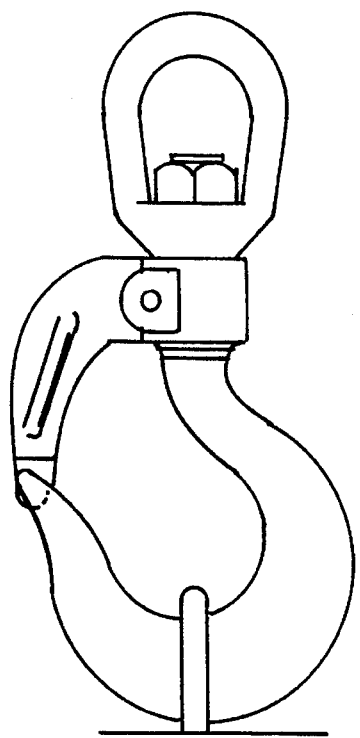
FIG. 2 is a side elevational view of another prior art crane hook.
Figure 3:
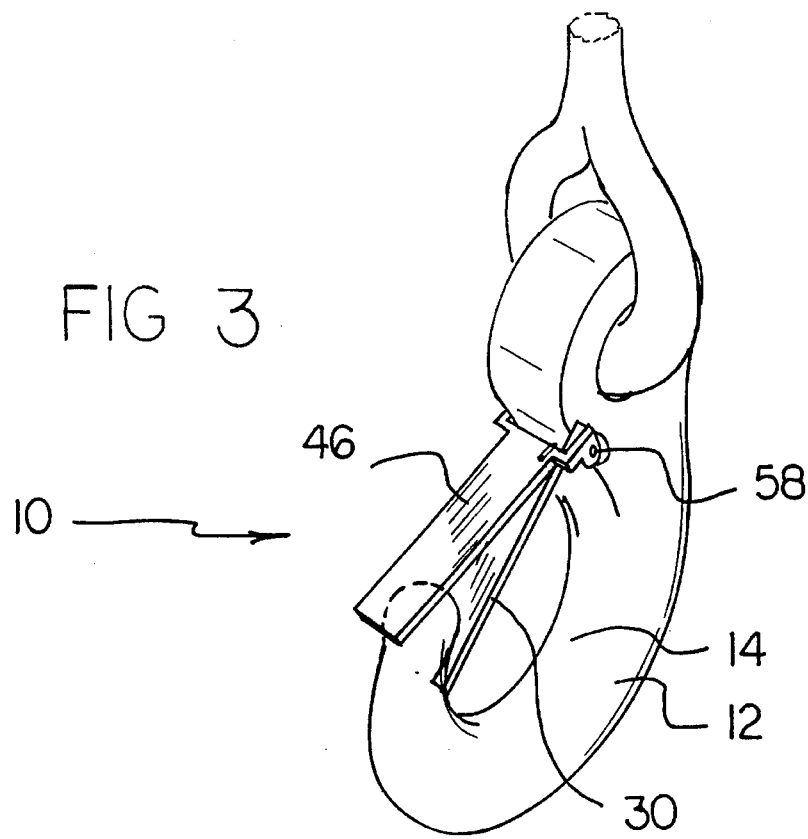
FIG. 3 is a perspective illustration of the preferred embodiment of the anti-snag plate for crane hooks constructed in accordance with the principles of the present invention.
Figure 4:
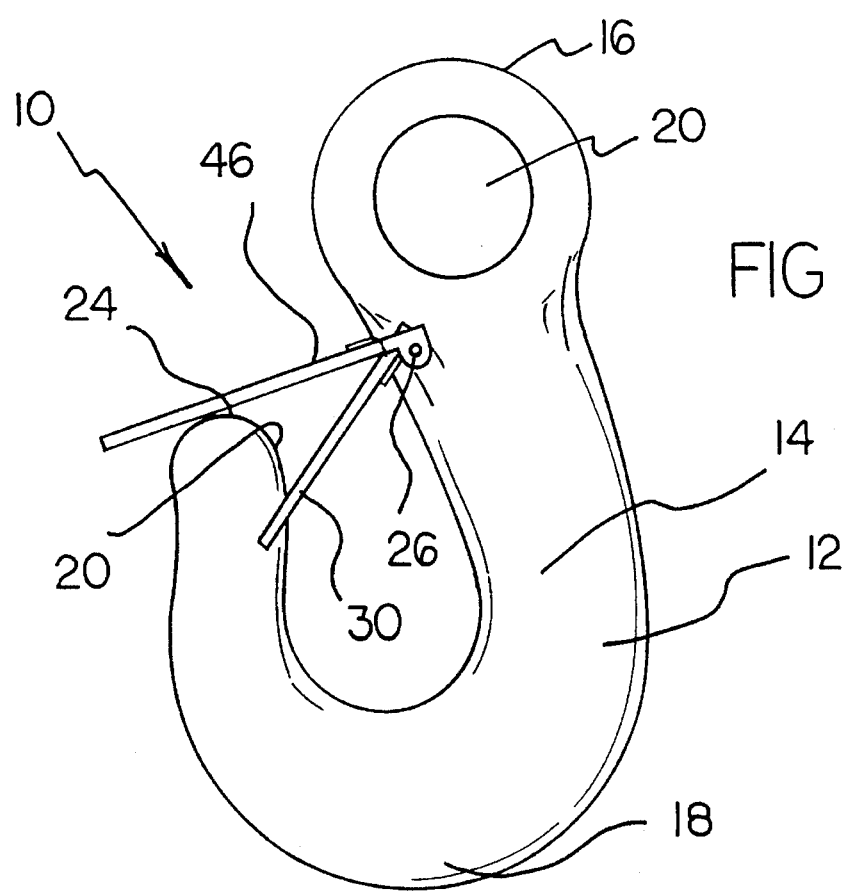
FIG. 4 is a side elevational view of the crane hook shown in FIG. 3.
Figure 5:
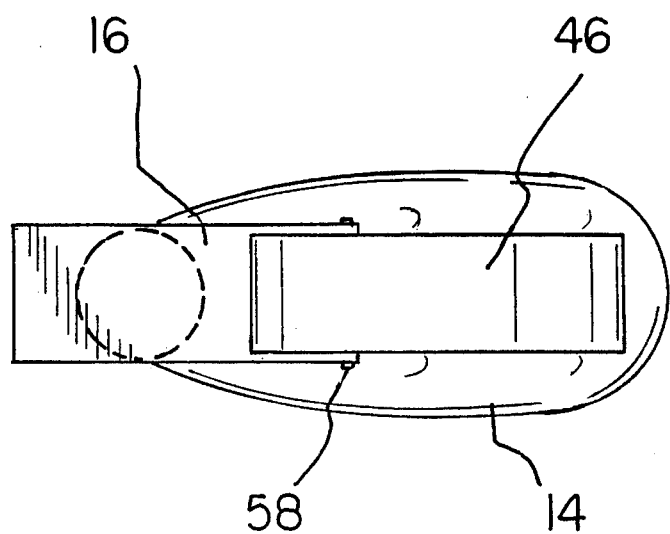
FIG. 5 is a top elevational view of the crane hook shown in FIGS. 3 and 4.
Figure 6:
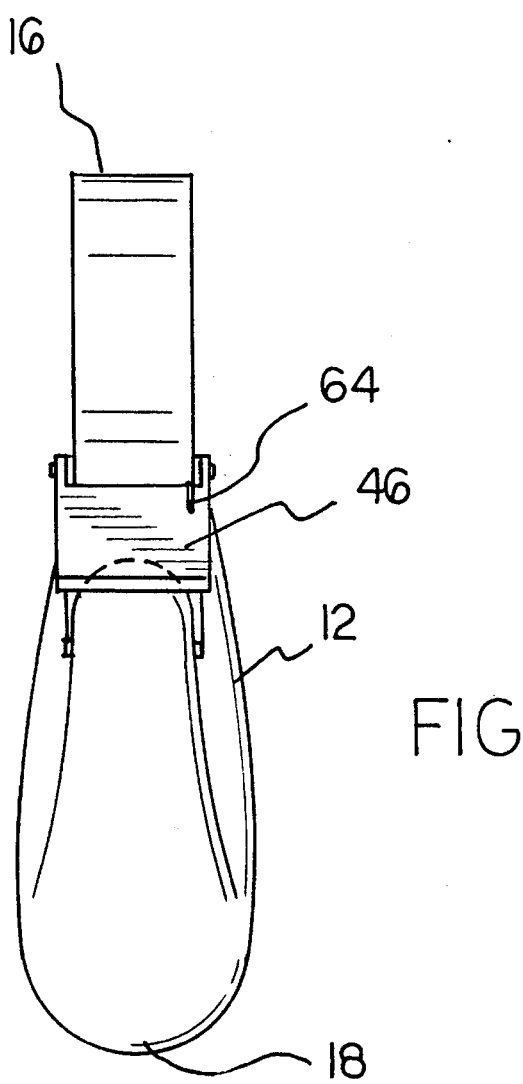
FIG. 6 is a front elevational view of the crane hook shown in FIGS. 2 through 5.
Figure 7:
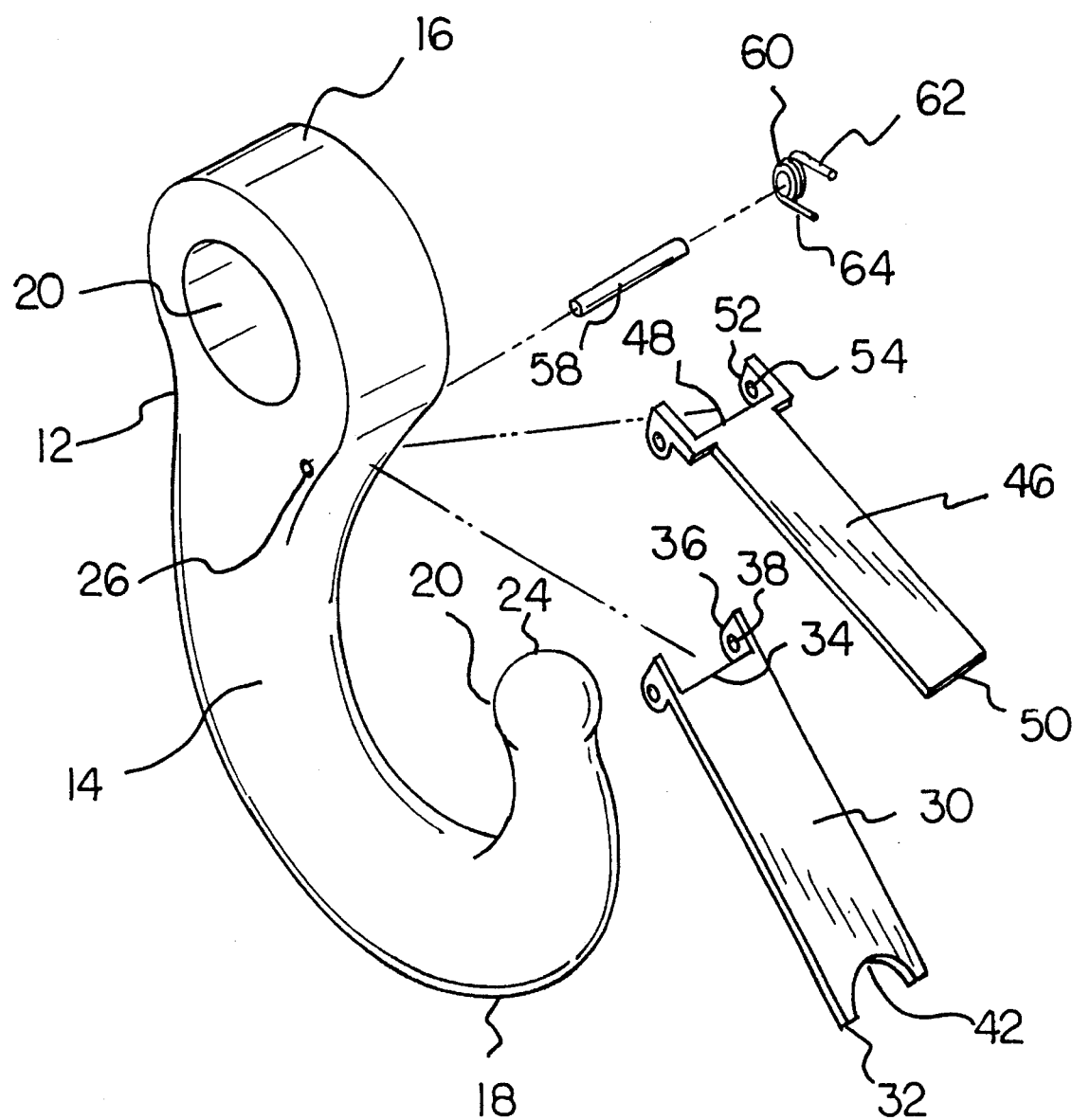
FIG. 7 is an exploded perspective view of the crane hook shown in the prior Figures.

With reference now to the drawings, and in particular to FIG. 3 thereof, a new and improved anti-snag plate for crane hooks embodying the principles and concepts of the present invention and generally designated by the reference numeral 10 will be described.

The present invention, the new and improved anti-snag plate for crane hooks, is comprised of a plurality of components. Such components in their broadest context include a crane hook, safety plate, anti-snag plate, and a pivot pin with a spring. Such components are individually configured and correlated with respect to each other so as to attain the desired objective.

The anti-snag plate assembly 10 of the present invention includes a crane hook 12 which forms the central component of the assembly 10. The crane hook has a shank 14 with an upper end 16 and a lower end 18. It is formed with an opening 20 extending through the upper end. The shank is curved and bent in a J-shaped configuration. This design includes an upwardly extending point 24. The point extends to an elevation beneath the opening. The shank also has a small aperture 26 adjacent to the opening 20 extending with parallel axes.

Next provided is a safety plate 30. The safety plate is of a rigid material, preferably metal, it is of an elongated configuration. It has a lower end 32 and an upper end 34. Downwardly extending legs 36 are formed at the upper end. Such legs are formed with co-axial apertures 38 extending therethrough. Such apertures are positionable in parallel alignment with the axis of the aperture of the shank.

The lower end of the safety plate is formed with a concave recess 42. Such recess is positionable in contact with the interior surface of the upstanding projection of the short end of the J-shaped configuration at a location slightly beneath the point. The safety plate is movably downward with respect to its intended location where it is held resiliently as will be described.

The next major component of the system is the anti-snag plate 46. Such plate is formed in a rectangular configuration. It includes an upper end 48 and a lower end 50. The upper end is formed with downwardly extending legs 52. It also includes apertures 54 parallel with respect to each other and coextensive with the axis of the small aperture and the apertures of the safety plate. The length of the snag plate is greater than that of the safety plate so that it will not move below the point of the hook. The lower end of the anti-snag plate is positioned upon the upper free end of the projection where it is held resiliently by a spring as will be described.

Lastly provided is a pivot pin 58. Such pivot pin is positioned through the minor aperture as well as the apertures of the anti-snag plate and the safety plate. In association therewith and coiled therearound is a coil spring 60. Such coil spring has free linear ends 62 and 64 in contact with the safety plate and anti-snag plate. This is done by positioning the free linear ends of the spring, one upon the upper surface of the anti-snag plate and the other on the lower surface of the safety plate. This tends to move the plates together toward the tip of the projection to thereby preclude the inadvertent coupling of objects to the projection of the hook for being secured to the hook through the safety plate.

The present invention comprises an anti-snag plate for crane hooks used in construction that prevents a hook from becoming lodged on fences, building features, and industrial electrical wiring.

It is fabricated from steel in the shape of a small, flat plate that conforms to the exterior of the hook, and spans the distance from the base of the safety latch to the end of the hook. It is mounted to the same pin as the safety latch, and opens upward when the load is removed. A small return spring helps to keep the anti-snag plate closed onto the end of the hook. The size of the plate is dependent upon the capacity of the hook itself. Three ton, five, seven, and even greater capacities can be accommodated by elongating the plate and making it thicker to suit the specific application.

To use it, the load is placed into the hook as it normally would be. The safety latch automatically returns to its location against the hook, and the anti-snag plate rests against the outer surface. If the hook makes contact with anything, it is prevented from entering through the safety latch. Ordinarily, items small enough to enter through the opening, such as wiring, usually require special precautions to prevent injury. This situation can be avoided with the addition of the anti-snag plate.

Its enhancement of safety in any application involving a crane hook is considerable, demanding the consideration of anyone working in the construction industry.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved anti-snag plate for crane hooks, comprising, in combination:

a crane hook having a shank with an upper end and a lower end and having an opening extending through the upper end, the shank being curved and bent in a J-shaped configuration and including an upstanding projection terminating at a point at an elevation beneath the opening, the shank having an aperture adjacent to the opening;

a safety plate formed of an elongated configuration having a lower end and an upper end with downwardly extending legs with apertures therethrough positionable in alignment with the aperture of the shank, the lower end of the safety plate being formed with a concave recess positionable in contact with the upstanding projection and movable downwardly with respect thereto;

an anti-snag plate formed in a rectangular configuration with an upper end and a lower end and an intermediate extent therebetween, the upper end being formed with downwardly extending legs and apertures therethrough positionable in alignment with the apertures of the safety plate and aperture of the shank, the intermediate extent being positionable upon the point of the projection; and a pivot pin positioned through the aperture of the shank as well as the apertures of the anti-snag plate and the safety plate and a coil spring having free linear ends, the free linear ends being positioned upon the upper surface of the anti-snag plate and the lower surface of the safety plate to move such plates together toward the tip of the projection to thereby preclude the inadvertent coupling of objects to the projection for being secured to the hook through the safety plate.

* * * * *